(12) United States Patent
Eriksson (10) Patent No.: US 6,466,666 B1
(45) Date of Patent: Oct. 15, 2002

(54) METHOD AND APPARATUS FOR ECHO ESTIMATION AND SUPPRESSION

(75) Inventor: Anders Eriksson, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/149,861

(22) Filed: Sep. 9, 1998

(30) Foreign Application Priority Data

Sep. 10, 1997 (SE) ................................................ 9703277

(51) Int. Cl.⁷ ................................................ H04M 9/00
(52) U.S. Cl. ................................ 379/406.01; 379/406.04; 379/406.05; 379/406.07
(58) Field of Search .................................. 370/286, 287, 370/288, 289, 290; 379/406.01, 406.04, 406.05, 406.07; 455/570

(56) References Cited

U.S. PATENT DOCUMENTS

| | | |
|---|---|---|
| 4,577,071 A | 3/1986 | Johnston et al. |
| 4,679,230 A | 7/1987 | Lassaux et al. |
| 4,751,730 A | 6/1988 | Galand et al. |
| 5,274,705 A | 12/1993 | Younce et al. |

FOREIGN PATENT DOCUMENTS

WO  97/23055  6/1997

OTHER PUBLICATIONS

Stock, Dirk, "On the Convergence Behavior of the LMS and the Normalized LMS Algorithms" *IEEE*, (1993).

*Primary Examiner*—Forester W. Isen
*Assistant Examiner*—Jefferey F. Harold
(74) *Attorney, Agent, or Firm*—Burns, Doane, Swecker & Mathis, L.L.P.

(57) ABSTRACT

A threshold estimation method in a telephony system estimates downlink power $R_x$ and uplink power $R_y$. Echo model parameter candidates $a_i$ and $b_i$ are recursively determined for delayed $R_x$ values. The $b_i$ having the minimum value is selected as an echo model parameter b, and in the corresponding delay $\Delta$ is identified as the current echo delay. The model parameter candidate $a_i$ having the same delay is selected as model parameter a. The current echo return loss ERL is estimated from the estimated values of a and b. The current clip level is estimated from the estimated value of ERL and the estimated value of $R_x$ that was measured $\Delta$ time steps previously.

24 Claims, 7 Drawing Sheets

METHOD AND APPARATUS FOR ECHO ESTIMATION AND SUPPRESSION

This application claims priority under 35 U.S.C. §§ 119 and/or 365 to Application No. 9703277-5 filed in Sweden on Sep. 10, 1997; the entire content of which is hereby incorporated by reference.

TECHNICAL FIELD

The present invention relates to a method and apparatus for echo estimation and suppression in telephony systems.

BACKGROUND

Echo is a problem related to the perceived speech quality in telephony systems with long delays, e.g. telephony over long distances or telephony systems using long processing delays, like digital cellular systems. The echo arises in the four-to-two wire conversion in the PSTN/subscriber interface (PSTN=Public Switched-Telephone Network). To remove this echo, echo cancellers are usually provided in transit exchanges for long distance traffic, and in mobile services switching centers for cellular applications.

Due to the location of the echo canceller it is made adaptive; the same echo canceller is used for many different subscribers in the PSTN. This adaptation is necessary not only between different calls, but also during each call, due to the non-fixed nature of the transmission network, e.g. phase slips, three-party calls, etc.

The main part of an echo canceller is an adaptive filter. The filter generates a replica of the echo, which is subtracted from the near end signal. Due to imperfect knowledge of the echo generating system, the estimated echo signal always contains errors. Hence, in practice, the echo attenuation obtained by using an adaptive filter is usually at most approximately 30 dB. For long time delays this attenuation is not enough, and in order to minimize the audible effects of these errors, a residual echo suppressor is used. The purpose of the echo suppressor is to further suppress the residual signal whenever this signal is dominated by the errors in the echo estimate. This is done by blocking the output of the echo canceller for certain levels of the output signal.

Reference [1] describes an echo canceller provided with an echo suppressor in the form of an adaptive center clipper. The echo estimate produced by the echo canceller is used to control, via signal processing means, the threshold, and thereby the clipping window, of this adaptive clipper. If the power of the residual signal falls below the adaptive threshold, the residual signal is blocked or clipped, otherwise the residual signal is passed through the adaptive clipper without modification. However, the residual signal contains not only residual echo, but also background noise produced at the near end subscriber. Occasionally residual echo samples and background noise samples add constructively, and the resulting residual signal may therefore exceed the threshold. The result is undesirable sporadic transmissions of residual signals containing residual echo, which can be very annoying.

Echo cancellers in transit exchanges or mobile switching centers are shared devices, which can be used towards any of a multitude of subscriber lines or echo paths. The characteristics of these echo paths can vary substantially. Particularly, the delay, the power level and the linearity of the echo may vary. This results in great difficulty in determining proper, fixed, values for the echo suppressor or non-linear processor (NLP). Hence, it is desirable to dynamically estimate the amount of echo power forwarded to the echo suppressor.

Another possible cause for echo is the acoustical and mechanical coupling of the loudspeaker and the microphone in telephone handset. For a mixed analog and digital network, such as a PSTN with analog two wire subscriber lines, this echo usually causes no audible disturbance. This is so because the echo from the handset is masked by the usually much stronger electrical echo in the four-to-two wire conversion. Furthermore, by applying an echo canceller for the latter echo, also the echo from the handset will be controlled.

On the other hand, in digital telephony systems even a low level of acoustical and mechanical cross-talk might become audible if the transmission delay is large. This has been recognized in the specification of several digital systems. As an example, the GSM specification (GSM=Global System for Mobile Communications) requires an echo loss of at least 46 dB between loudspeaker and microphone, as measured in the Switching System. This echo loss should be measured with the handset earpiece sealed to the ear, and with the volume control of the telephone set to its maximum. However, in normal use there is usually a gap between ear and earpiece, which might result in a lower echo loss. Thus, although a handset may fulfill the GSM specification, in practice there is still a possibility that echo might be observed during normal use. Hence, it may be desirable to detect and cancel also this echo from the switching system.

SUMMARY

An object of the present invention is to provide an echo power estimation and suppression method and apparatus that avoids the above mentioned problems.

Briefly, the present invention is based on the finding that there is a correlation between the power of a delayed echo and the power of the signal generating the echo. This correlation is used to build a model capable of estimating echo return loss and delay. These parameters are used to form a clip level used as a dynamic threshold for controlling an echo suppressor. The method is also computationally efficient.

BRIEF DESCRIPTION OF THE DRAWINGS

The invention, together with further objects and advantages thereof, may best be understood by making reference to the following description taken together with the accompanying drawings, in which.

DETAILED DESCRIPTION

In the following description elements performing the same or similar functions have been provided with the same reference designations.

Before the invention is described in detail, the two environments in which the invention is to be used will be more fully described.

Figure 1:
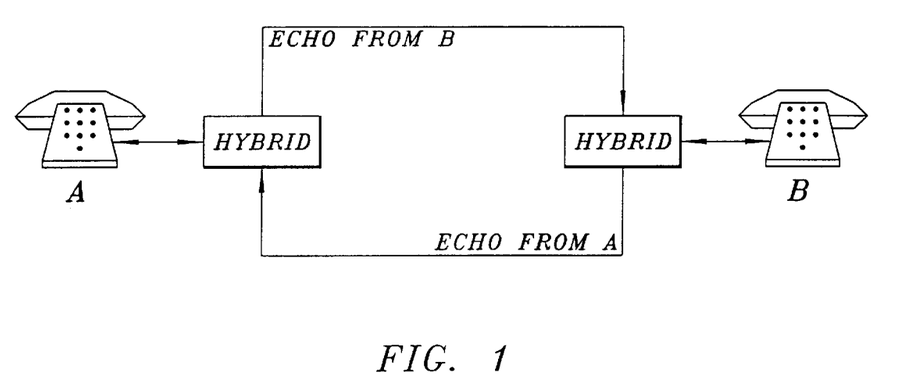
FIG. 1 is a block diagram of an echo generating system.

FIG. 1 illustrates the echo generating process in a telephony system. A subscriber A, called the far end subscriber below, is connected to a hybrid (a hybrid forms the interface between a four-wire and a two-wire connection, as is well known in the art) over a two-wire line. Similarly a subscriber B, called the near end subscriber below, is connected to another hybrid over a two-wire line. The two-wire lines transfer both incoming and outgoing speech signals. Outgoing speech from far end subscriber A is transferred to near end subscriber B over the upper two-wire line in FIG. 1. Similarly outgoing speech from near end subscriber B is transferred to far end subscriber A on the lower two-wire line in FIG. 1. However, the lower two-wire line from subscriber B to subscriber A also contains an echo of outgoing speech from subscriber A, which the hybrid at subscriber B was not able to suppress completely. Similarly the upper two-wire line in FIG. 1 contains echo from outgoing speech from subscriber B.

Figure 2:
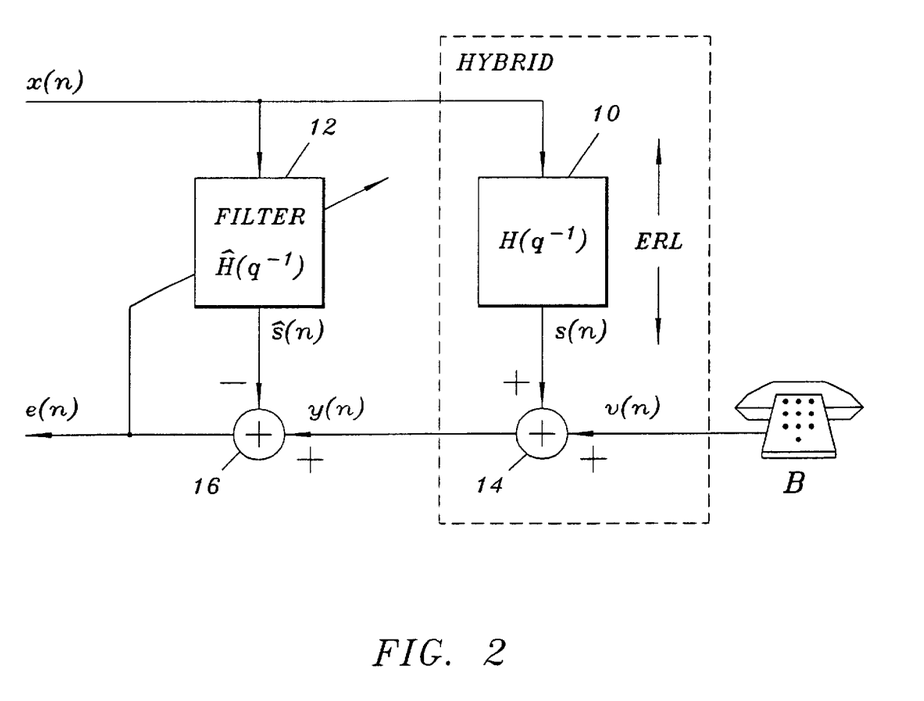
FIG. 2 is a block diagram of an echo cancellation system.

FIG. 2 illustrates how the echo back to subscriber A is cancelled at the near end side (a similar arrangement is provided at the far end side). Input signal x(n), where n denotes discrete time, represents speech from subscriber A. The input signal x(n) is attenuated by the hybrid, represented by a filter 10 with transfer function $H(q^{-1})$, where $q^{-1}$ represents the backward shift operator ($q^{-1}x(n)=x(n-1)$), and a summation unit 14, and the resulting echo signal s(n) is combined with the near end signal v(n), which may or may not contain near end speech, in summation unit 14. The attenuation of filter 10 is represented by the echo path attenuation ERL (ERL=Echo Return Loss). Thus, the resulting output signal y(n) contains both the near end signal and echo from the far end signal. Furthermore, input signal x(n) is also forwarded to an adaptive filter 12, which models the impulse response of the hybrid by adjusting its filter coefficients. The resulting estimate of echo signal s(n) is denoted ŝ(n). This estimate is, in a summation unit 16, subtracted from output signal y(n), and the resulting error signal e(n) is forwarded to adaptive filter 12 for adjustment of the filter coefficients and to the two-wire line back to far end subscriber A. The coefficients of filter 12 may be adjusted in accordance with, for example, the NLMS algorithm (see [2]).

Figure 3:
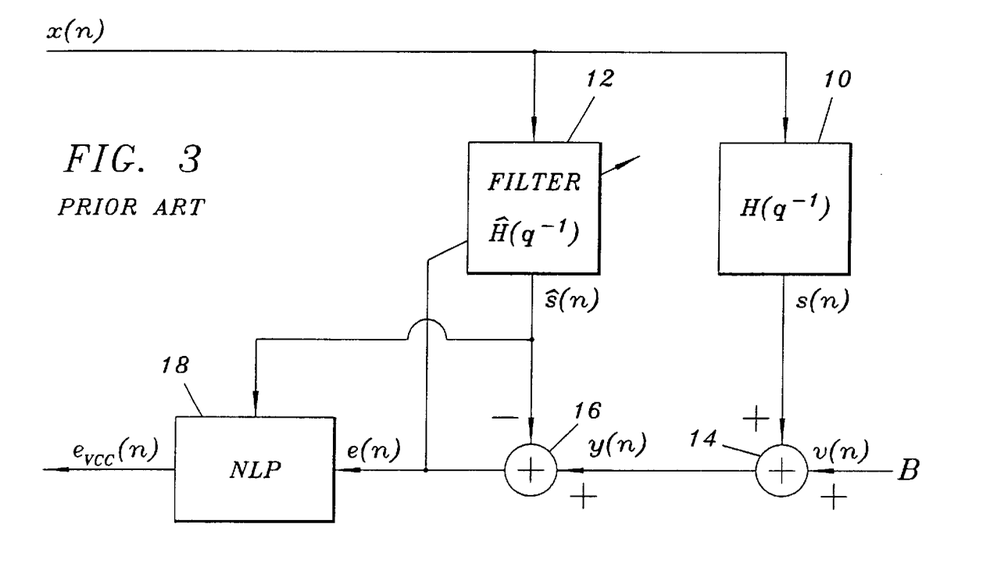
FIG. 3 is a block diagram of a previously known echo canceller with a variable center clipper.
Figure 4:
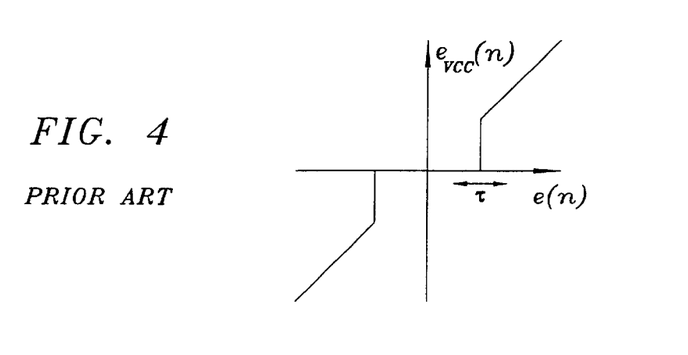
FIG. 4 is a diagram illustrating the transfer function of the center clipper of the echo canceller of FIG. 3.

Since adaptive filter 12 may not completely remove the echo, the echo canceller may be supplemented by an echo suppressor. FIG. 3 illustrates an arrangement of this type described in reference [1]. Here the echo suppressor has the form of a variable center clipper 18, which is controlled by the estimated echo signal ŝ(n). The output signal $e_{vcc}(n)$ from center clipper 18 may be described by:

$$e_{vcc}(n) = \begin{cases} 0: & |e(n)| < \tau = \delta \cdot |\hat{s}(n)| \\ e(n): & |e(n)| \geq \tau \end{cases}$$

where τ is the variable threshold of center clipper 18 and δ is a constant scaling factor. This transfer function is illustrated in FIG. 4. Thus, if signal e(n) falls within the center window it will be completely blocked, otherwise it will pass through center clipper 18 unaltered. However, threshold τ depends on the value of ŝ(n). Thus, if ŝ(n) has a low magnitude, threshold τ will also be low. In this case |e(n)| may actually exceed the threshold if signal e(n) contains significant background noise from subscriber B. Thus, signal $e_{vcc}(n)$ may contain sporadic signals containing echo and background noise. The solution in accordance with the present invention described below will eliminate this problem.

Figure 5:
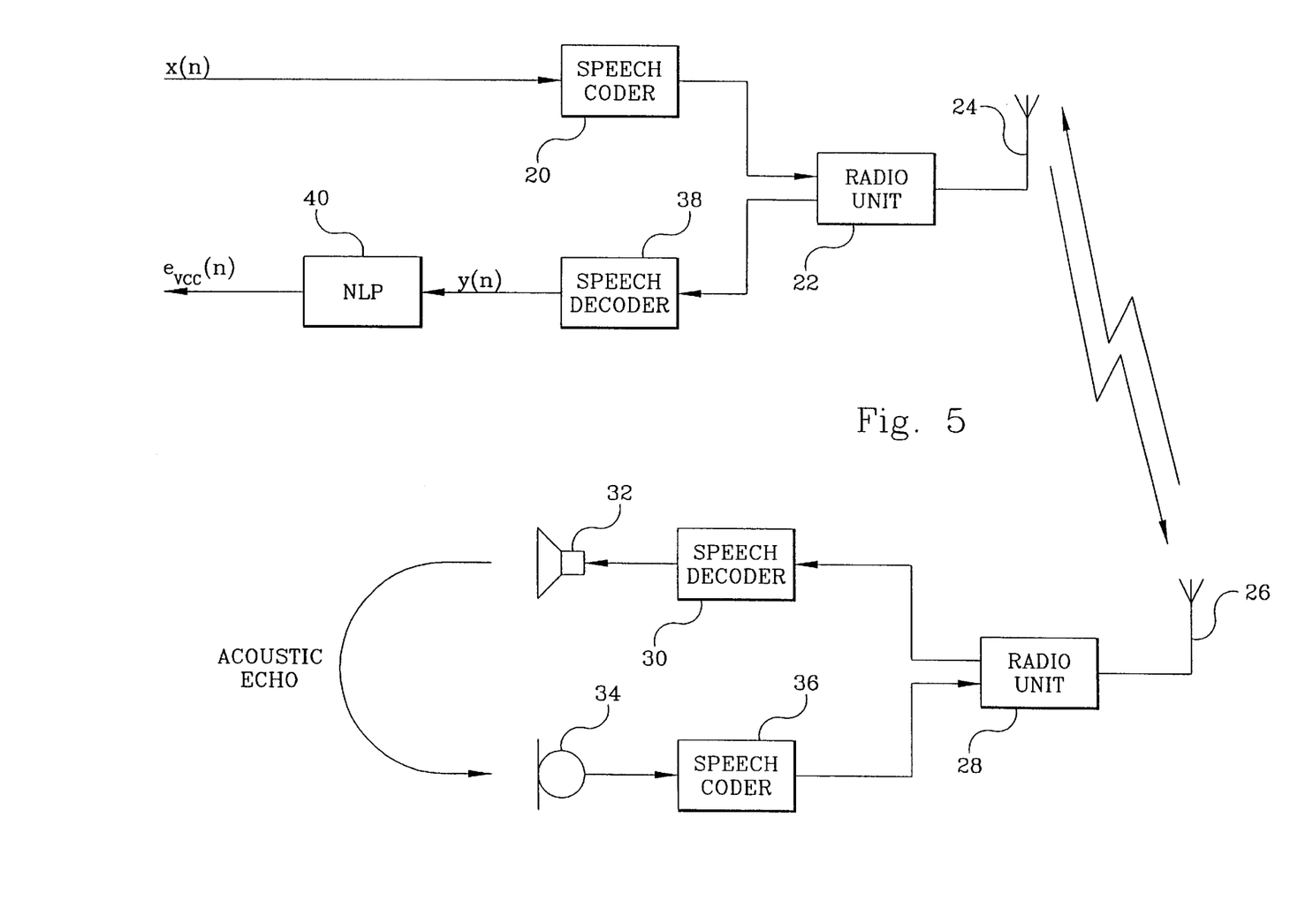
FIG. 5 is a block diagram of an echo generating system in a cellular telephony system.

Another environment in which echo is generated is illustrated in FIG. 5. This figure shows relevant parts of a digital cellular telephony system. A signal x(n), called the downlink signal below, from a far end subscriber is forwarded to a speech coder 20, which transforms the speech samples x(n) in to speech code. The speech code is forwarded to a radio unit 22 for transmission on an antenna 24. The transmitted signal is received on an antenna 26 and a radio unit 28 of a mobile station. The received speech code is decoded in a speech decoder 30 and the decoded speech is forwarded to a loudspeaker (earpiece) 32. As indicated by the curved arrow in FIG. 5, sound from loudspeaker 32 will also partially reach a microphone 34 of the mobile station. The echo containing signal from microphone 34 is encoded in a speech coder 36, and reaches a speech decoder 38 over radio unit 28, antennas 26, 24 and radio unit 22. The decoded echo signal y(n), denoted the uplink signal below, is forwarded to an echo suppressor or NLP 40.

The system in FIG. 5 may also contain an echo canceller before echo suppressor 40, but since an echo canceller is a linear filter that removes only linear echo effects and speech coding/decoding is a strongly non-linear process, the echo canceller may also be omitted, as in FIG. 5.

The problem that the present invention solves is how to control echo suppressors 18, 40 in an efficient way. The solution will now be described in detail with reference to FIGS. 6–13.

Figure 6:
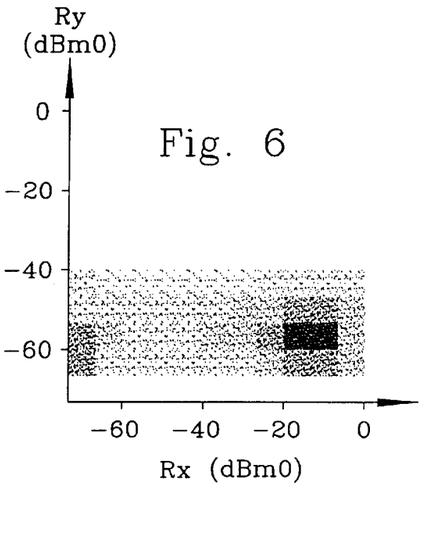
FIG. 6 is a scatter diagram illustrating the correlation between the power of uplink and downlink signals in a cellular telephony system with zero delay between the signals.

FIG. 6 is a scatter diagram illustrating the dependence of the power $R_y$ of the uplink signal y(n) in FIG. 5 on the power $R_x$ of the downlink signal x(n) when the delay between the signals has been ignored. The powers have been calculated in accordance with the equations:

$$R_x(n) = \sum_{k=0}^{N-1} x^2(n-k)$$

$$R_y(n) = \sum_{k=0}^{N-1} y^2(n-k)$$

(Other power calculation methods, for example an exponential window may also be used.) The power is calculated every N:th speech sample (N=64, for example). The diagram represents many samples (480,000 speech samples or 60 seconds of speech). The intensity at any given point represents the number of power samples at that point. It is apparent from FIG. 6 that there is little or no correlation between power samples if the delay is ignored.

Figure 7:
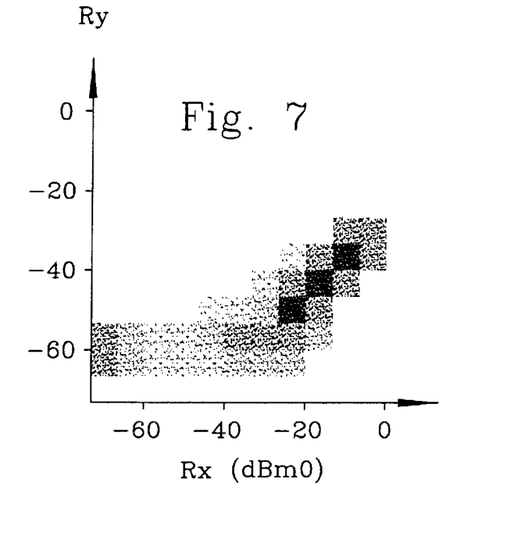
FIG. 7 is a scatter diagram illustrating the correlation between the power of uplink and downlink signals in a cellular telephony system with delay between the signals.

FIG. 7 is based on the same data, but in this case a delay of 208 ms has been assumed between downlink and uplink signals. The difference is evident. In this case there is a strong correlation between power measures $R_x$ and $R_y$, at least for $R_x > -30$ dBm0. For $R_x < -30$ dBm0, $R_y$ is $-60$ dBm0 regardless of the value of $R_x$. FIG. 7 suggests that some kind of model may be used to describe the relationship between the uplink and downlink signals. As a starting point it is noted that:

$$R_y(n) = R_s(n) + R_v(n)$$

where $R_s$ represents the power of the echo and $R_v$ represents the power of the signal produced at the near end (mobile). By definition the power of the echo, $R_s$, is:

$$R_s(n) = \frac{R_x(n)}{10^{\frac{ERL}{10}}}$$

and therefore $R_y$ may be written as:

$$R_y(n) = \frac{R_x(n)}{10^{\frac{ERL}{10}}} + R_v(n)$$

Computing the logarithm of both sides, this may be approximated by:

$$\log(R_y(n)) = \begin{cases} \log(R_v(n)) & \log(R_v(n)) > \log(R_x(n)) - \gamma ERL \\ (1-C)\log(R_v(n)) + & \log(R_v(n)) \le \log(R_x(n)) - \gamma ERL \\ C(\log(R_x(n)) - \gamma ERL) & \end{cases}$$

where $\gamma = \log(10)/10$ and $C \approx 1$ is a predetermined constant. The purpose of C is to provide a better approximation when $\log R_v = \log R_x - \gamma ERL$. In this approximation $R_v$ and ERL are considered unknown. Introduce parameters a(n) and b(n) defined by:

$$a(n) = \log(R_v(n))$$

$$b(n) = \gamma ERL + a(n)$$

Figure 8:
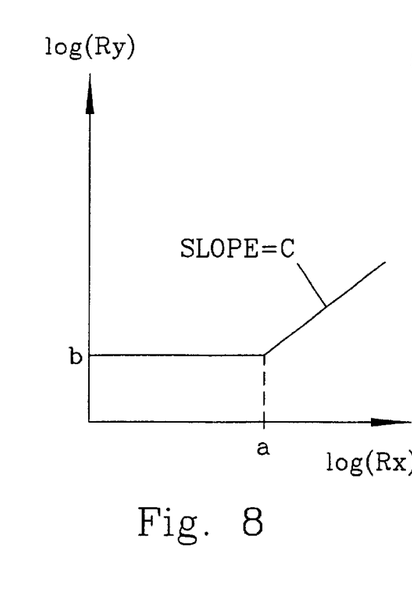
FIG. 8 is a diagram illustrating the correlation model between the power of uplink and downlink signals in a cellular telephony system with delay between the signals.

With these definitions the above approximation may be rewritten as:

$$\log(R_y(n)) = a(n) + C \cdot \max(0, \log(R_x(n)) - b(n))$$

where the parameters a(n) and b(n) have to be estimated dynamically. This model is illustrated graphically in FIG. 8.

The previous equation does not give explicit information regarding echo delay. To determine the delay, the parameters a(n) and b(n) of the model are computed for a number of different delays, and the delay corresponding to the smallest b(n) estimate is selected as an estimate of the actual echo delay. The ERL is estimated in accordance with ERL=(b(n)−a(n))/γ, where a(n) and b(n) are the parameters that correspond to the estimated delay. The parameter estimation is preferably performed by a recursive algorithm. The power estimates $R_x$ and $R_y$ are computed for a rectangular window with N=64, for example. Delayed estimates of the downlink power estimate $R_x$ are stored up to a delay corresponding to an expected maximum echo delay. For example, if it known that the echo delay is at most 264 ms, a total of 33 delayed power estimates need to be stored (33×64=2112 samples, which corresponds to 264 ms for a sampling frequency of 8000 sample/s). Estimates of the parameters a and b are then computed recursively every Nth sample for each delay by the following LMS type algorithm:

$$\left. \begin{array}{l} e_i(n) = \log(R_y(n)) - a_i(n) - C \cdot \max[0, \log(R_x(n-i \cdot N) - b_i(n)] \\ a_i(n+1) = a_i(n) + \mu_a \cdot e_i(n) \\ b_i(n+1) = \begin{cases} b_i(n) - \mu_b \cdot C \cdot e_i(n) & \log(R_x(n-i \cdot N)) > b_i(n) \\ b_i(n) & \text{otherwise.} \end{cases} \end{array} \right\}$$

$$i = 0 \cdots i_{max}$$

where
  i is an index representing a delay by i·N steps of discrete time,
  $i_{max}$ is an integer representing the maximum delay by $i_{max}$·N steps of discrete time,
  $a_i(n)$ and $b_i(n)$ denote the model parameter estimates corresponding to a delay of i samples,
  $e_i(n)$ denotes an estimation error associated with a delay of i samples, and
  $\mu_a$ and $\mu_b$ denote step length parameters of the algorithm.

In the algorithm "log" may be implemented as the integer part of the 2-logarithm to further reduce complexity.

Figure 9:
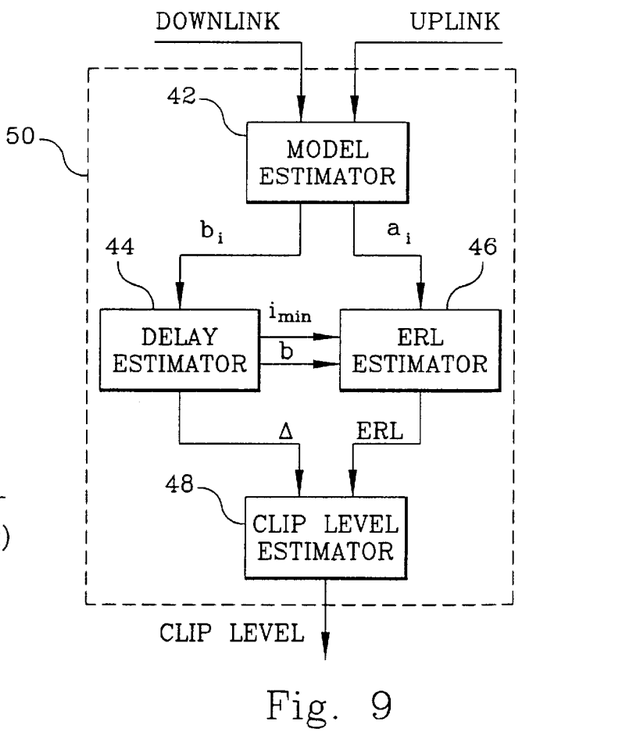
FIG. 9 is a block diagram of an apparatus for estimating a dynamic threshold for controlling an echo suppressing non-linear processor.

This algorithm is performed by block 42 in the threshold estimator 50 in FIG. 9. In block 44 the echo delay is identified as the discrete time delay that gave the smallest $b_i(n)$ value. This minimum value is also used as the current parameter value b(n). Thus, the delay Δ is calculated as:

$$\Delta(n) = delay(b_{min}(n))$$

The determined index i and the corresponding parameter value b(n) are now used by block 46 to estimate the echo return loss ERL according to:

$$ERL(n) = \frac{a(n) - b(n)}{\gamma}$$

where a(n) is the value $a_i(n)$ that has the same delay as b(n) (the same index i).

Finally block 48 estimates a dynamic threshold or clip level using the estimated delay Δ and echo return loss ERL in accordance with:

$$\text{clip level} = \kappa \frac{R_x(n-\Delta)}{10^{\frac{ERL}{10}}}$$

where κ is a constant, preferably of order 10, introduced to account for uncertainties in the estimate of ERL.

Preferably the functions of the blocks of threshold estimator 50 are performed by one or several micro/signal processors.

Figure 10:
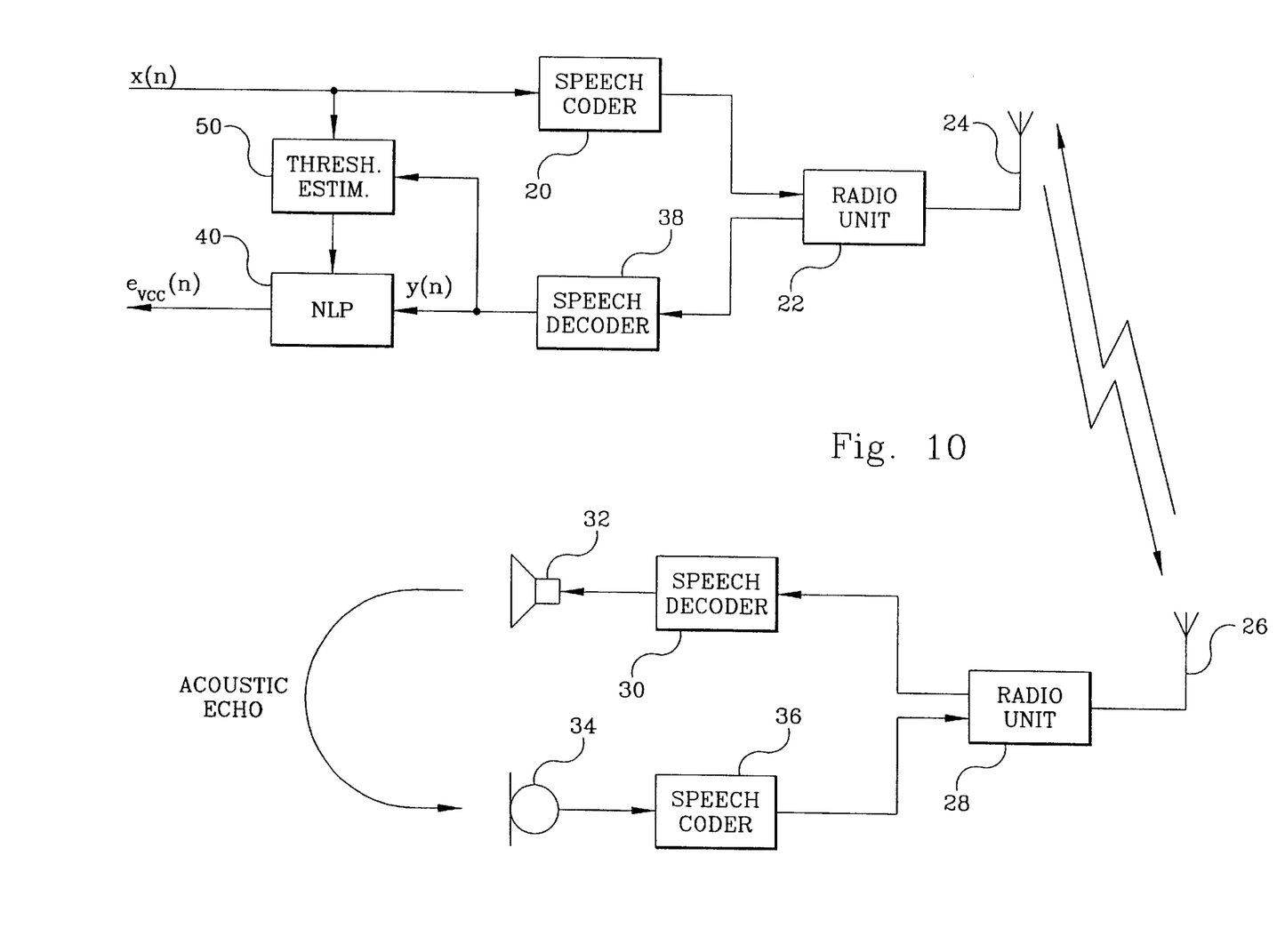
FIG. 10 is a block diagram of a cellular telephony system provided with a threshold estimator for controlling a non-linear processor.

FIG. 10 illustrates a digital cellular telephony system similar to the system in FIG. 5, but provided with a threshold estimator 50 in accordance with the present invention for controlling echo suppressor 40. As described above threshold estimator 50 estimates a dynamic clip level. This clip level is forwarded to echo suppressor 40. If the power of uplink signal y(n) falls below this clip level, the signal is assumed to be dominated by echo and is blocked, otherwise it assumed to be dominated by the near end signal from the mobile station and is passed through echo suppressor 40 without change. If the signal is blocked, comfort noise may be added instead. The comparison with the dynamic clip level is performed on a sample by sample basis.

The same type of echo suppressor control as described above with reference to a cellular telephony system may also be used in a regular PSTN. This is illustrated in FIGS. 11 and 12.

Figure 11:
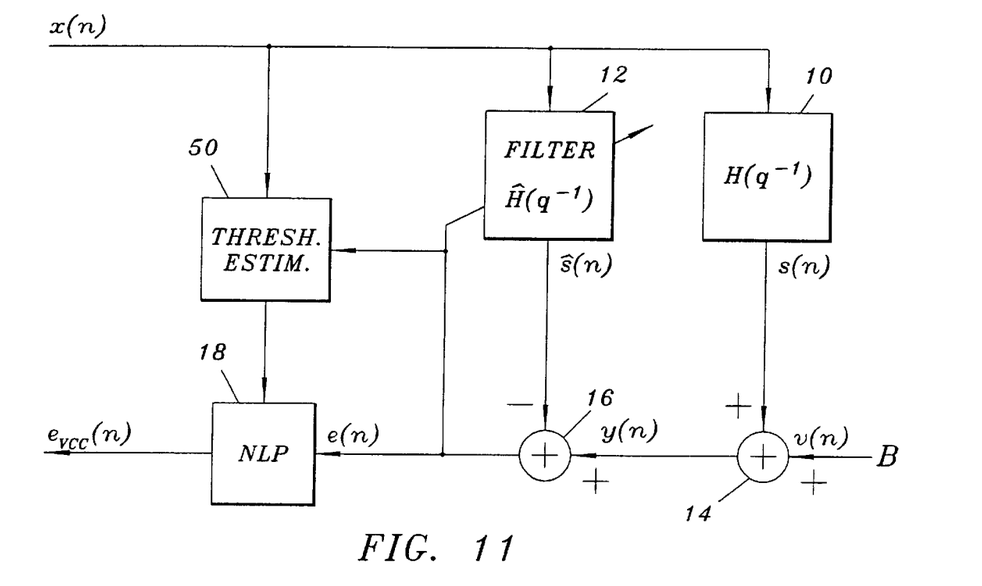
FIG. 11 is a block diagram of a telephony system provided with a threshold estimator for controlling a non-linear processor provided after an echo canceller.

FIG. 11 is a block diagram of a telephony system that is provided with a threshold estimator 50 for controlling a non-linear processor or echo suppressor 18 provided after an echo canceller. In this embodiment the "downlink" signal corresponds to signal x(n) from the far end subscriber, while the "uplink" signal is represented by residual echo signal e(n). Under these assumptions echo suppressor 18 is controlled in the same way as echo suppressor 40 in FIG. 10.

Figure 12:
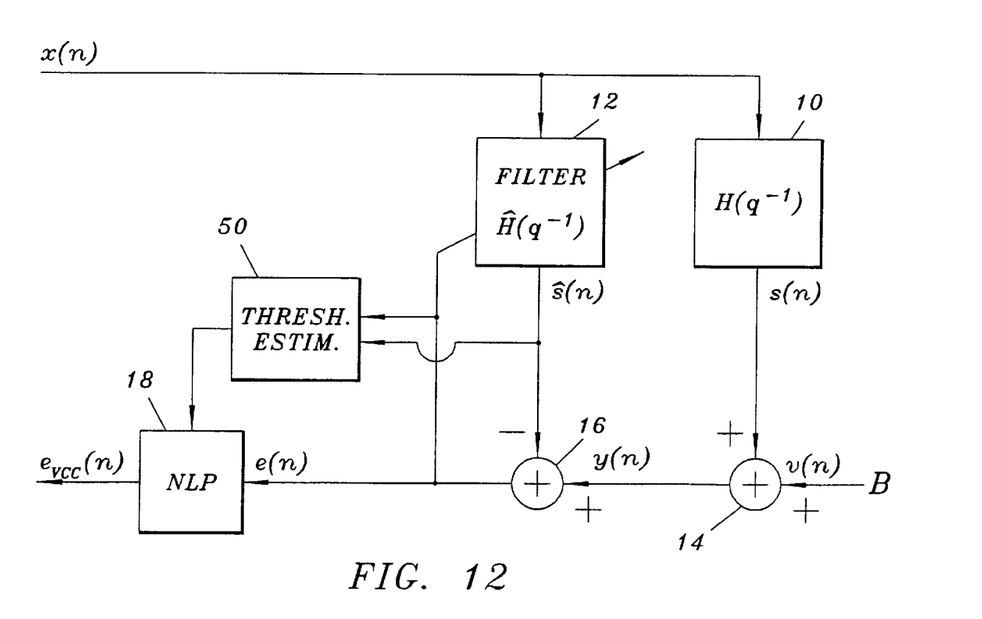
FIG. 12 is a block diagram of a modified embodiment of a telephony system provided with a threshold estimator for controlling a non-linear processor provided after an echo canceller.

FIG. 12 is another embodiment of a telephony system that is provided with a threshold estimator 50 for controlling a non-linear processor or echo suppressor 18 provided after an echo canceller. In this embodiment the "downlink" signal corresponds to echo estimate signal ŝ(n) instead of far end subscriber signal x(n). The reason for this is that since the echo estimate has to be calculated to control the echo canceller anyway, and since it obviously is strongly correlated to signal x(n), it might as well be reused for the threshold estimation.

Figure 13:
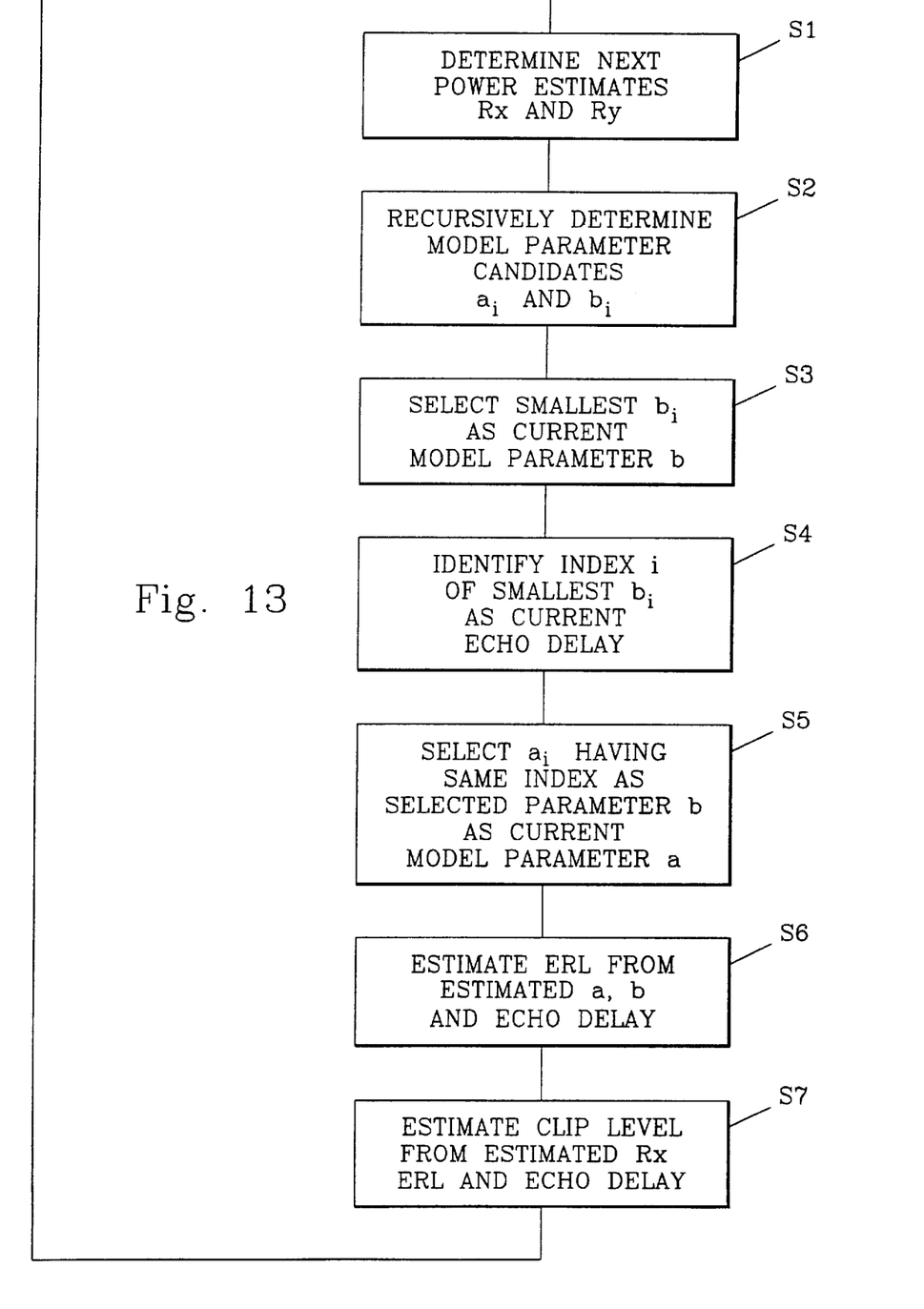
FIG. 13 is a flow chart illustrating the threshold estimation method in accordance with the present invention.

FIG. 13 is a flow chart illustrating the threshold estimation method in accordance with the present invention. In step S1 current estimates $R_x$ and $R_y$ are calculated. Step S2 recursively determines model parameter candidates $a_i$ and $b_i$ for delayed $R_x$ values. In step S3 the $b_i$ having the minimum value is selected as model parameter b, and in step S4 the corresponding delay Δ (index i) is identified as the current echo delay. The model parameter candidate $a_i$ having the same delay is selected as model parameter a in step S5. Step S6 estimates the current echo return loss ERL from the estimated values of a, b and delay. In step S8 the current clip level is estimated from the estimated value of ERL and the estimated value of $R_x$ that was measured Δ time steps previously. Finally the process loops back to step S1 to determine the next estimates of $R_x$ and $R_y$ (at the same time the oldest value of $R_x$ is dropped).

The present invention is a computationally efficient method for detecting and estimating power level and delay of a low level echo, such as the echo originating from acoustic cross-talk in mobile terminals or the residual echo remaining after the linear filter of an echo canceller. The determined parameters may be used to control the operation of a switch (NLP) which blocks transmission when echo is present.

For elimination of cross-talk echo the present invention may result in great computational savings, since a standard echo canceller may be replaced by a dynamically controlled echo-suppressing switch. Due to the non-linearities of the echo path in this application, the subjective performance of the proposed method is similar to the performance of a much more complex echo canceller.

It will be understood by those skilled in the art that various modifications and changes may be made to the present invention without departure from the spirit and scope thereof, which is defined by the appended claims.

REFERENCES

[1] U.S. Pat. No. 4,577,071, assigned to British Telecommunications
[2] D. T. M. Slock, "On the Convergence Behavior of the LMS and the Normalized LMS Algorithms", IEEE Transactions on Signal Processing, 41(9):2811–2825, September 1993

What is claimed is:

1. An echo power estimation method in a telephony system, comprising forming an echo power estimate $R_y(n)$ of an echo signal, said echo power estimate depending on an input power estimate $R_x(n)$ of an input signal in accordance with the approximation:

$$log(R_y(n))=a(n)+C \cdot max(0,log(R_x(n))-b(n))$$

where n represents discrete time, a(n) and b(n) are dynamically updated model parameters, and C is a predetermined constant.

2. The method of claim 1, comprising determining said model parameters a(n) and b(n) in a recursive algorithm.

3. The method of claim 2, comprising a recursive algorithm in accordance with the equations:

$$\left.\begin{aligned} e_i(n) &= \log(R_y(n)) - a_i(n) - C \cdot \max[0, \log(R_x(n-i \cdot N) - b_i(n)] \\ a_i(n+1) &= a_i(n) + \mu_a \cdot e_i(n) \\ b_i(n+1) &= \begin{cases} b_i(n) - \mu_b \cdot C \cdot e_i(n) & \log(R_x(n-i \cdot N)) > b_i(n) \\ b_i(n) & \text{otherwise.} \end{cases} \end{aligned}\right\}$$

$$i = 0 \cdots i_{max}$$

where

N is a predetermined integer, i is an index representing a delay by i·N steps of discrete time, $i_{max}$ is an integer representing the maximum delay by $i_{max}$·N steps of discrete time, $a_i(n)$ and $b_i(n)$ denote model parameter estimates corresponding to a delay of i samples, $e_i(n)$ denotes an estimation error associated with a delay of i samples, and $\mu_a$ and $\mu_b$ denote step length parameters of the algorithm; and selecting the model parameter estimates $a_i(n)$ and $b_i(n)$ that are associated with the index i that gives the smallest value of $b_i(n)$ as the current model parameters a(n) and b(n).

4. The method of claim 3, comprising calculating said input power estimate in accordance with the equation:

$$R_x(n) = \sum_{k=0}^{N-1} x^2(n-k)$$

where x(n) is said input signal; and calculating said echo power estimate in accordance with the equation:

$$R_y(n) = \sum_{k=0}^{N-1} y^2(n-k)$$

where y(n) is said echo signal.

5. The method of claim 1, comprising estimating an echo delay Δ as the delay of the selected current model parameter b(n).

6. The method of claim 1, comprising
estimating an echo return loss ERL in accordance with the equation:

$$ERL(n) = \frac{a(n) - b(n)}{\gamma}$$

where $\gamma$ is log (10)/10.

7. The method of claims 1, wherein characterized by said echo signal is a residual echo signal remaining after an echo canceller.

8. The method of claim 1, wherein said input signal is a downlink signal to a mobile station and said echo signal is an uplink signal from said mobile station.

9. An echo suppression method in a telephony system, comprising:
forming an echo power estimate $R_y(n)$ of an echo signal, said echo power estimate depending on an input power estimate $R_x(n)$ of an input signal in accordance with the approximation:

$$log(R_y(n)) = a(n) + C \cdot max(0, log(R_x(n)) - b(n))$$

where n represents discrete time, a(n) and b(n) are dynamically updated model parameters, and C is a predetermined constant;
estimating an echo delay $\Delta$ by the model parameter b(n);
estimating an echo return loss ERL in accordance with the equation:

$$ERL = \frac{a(n) - b(n)}{\gamma}$$

where $\gamma$ is log (10)/10;
estimating a dynamic clip level in accordance with the equation:

$$\text{clip level} = \kappa \frac{R_x(n - \Delta)}{10^{\frac{ERL}{10}}}$$

where $\kappa$ is a predetermined constant, and;
suppressing said echo signal whenever its power falls below said clip level.

10. The method of claim 9, comprising determining said model parameters a(n) and b(n) in a recursive algorithm.

11. The method of claim 10, comprising
a recursive algorithm in accordance with the equations:

$$\left.\begin{array}{l} e_i(n) = \log(R_y(n)) - a_i(n) - C \cdot \max[0, \log(R_x(n - i \cdot N) - b_i(n)] \\ a_i(n+1) = a_i(n) + \mu_a \cdot e_i(n) \\ b_i(n+1) = \begin{cases} b_i(n) - \mu_b \cdot C \cdot e_i(n) & \log(R_x(n - i \cdot N)) > b_i(n) \\ b_i(n) & \text{otherwise.} \end{cases} \end{array}\right\}$$

$$i = 0 \cdots i_{\max}$$

where
N is a predetermined integer,
i is an index representing a delay by i·N steps of discrete time,
$i_{max}$ is an integer representing the maximum delay by $i_{max}$·N steps of discrete time,
$a_i(n)$ and $b_i(n)$ denote model parameter estimates corresponding to a delay of i samples, $e_i(n)$ denotes an estimation error associated with a delay of i samples, and
$\mu_a$ and $\mu_b$ denote step length parameters of the algorithm; and
selecting the model parameter estimates $a_i(n)$ and $b_i(n)$ that are associated with the index i that gives the smallest value of $b_i(n)$ as the current model parameters a(n) and b(n).

12. The method of claim 11, comprising
calculating said input power estimate in accordance with the equation:

$$R_x(n) = \sum_{k=0}^{N-1} x^2(n - k)$$

where x(n) is said input signal; and
calculating said echo power estimate in accordance with the equation:

$$R_y(n) = \sum_{k=0}^{N-1} y^2(n - k)$$

where y(n) is said echo signal.

13. The method of claim 9, wherein said echo signal is a residual echo signal remaining after an echo canceller.

14. The method of claim 9, wherein said input signal is a downlink signal to a mobile station and said echo signal is an uplink signal from said mobile station.

15. An echo power estimation apparatus in a telephony system, comprising
means for forming an echo power estimate $R_y(n)$ of an echo signal, said echo power estimate depending on an input power estimate $R_x(n)$ of an input signal in accordance with the approximation:

$$log(R_y(n)) = a(n) + C \cdot max(0, log(R_x(n)) - b(n))$$

where
n represents discrete time,
a(n) and b(n) are dynamically updated model parameters, and
C is a predetermined constant.

16. The apparatus of claim 15, comprising means for recursively determining said model parameters a(n) and b(n).

17. The apparatus of claim 16, comprising
means for recursively determining said model parameters a(n) and b(n) in accordance with the equations:

$$\left.\begin{array}{l} e_i(n) = \log(R_y(n)) - a_i(n) - C \cdot \max[0, \log(R_x(n - i \cdot N) - b_i(n)] \\ a_i(n+1) = a_i(n) + \mu_a \cdot e_i(n) \\ b_i(n+1) = \begin{cases} b_i(n) - \mu_b \cdot C \cdot e_i(n) & \log(R_x(n - i \cdot N)) > b_i(n) \\ b_i(n) & \text{otherwise.} \end{cases} \end{array}\right\}$$

$$i = 0 \cdots i_{\max}$$

where
N is a predetermined integer,
i is an index representing a delay by i·N steps of discrete time,
$i_{max}$ is an integer representing the maximum delay by $i_{max}$·N steps of discrete time, $a_i(n)$ and $b_i(n)$ denote model parameter estimates corresponding to a delay of i samples, $e_i(n)$ denotes an estimation error associated with a delay of i samples, and $\mu_a$ and $\mu_b$ denote step length parameters of the algorithm; and means for selecting the model parameter estimates $a_i(n)$ and $b_i(n)$ that are associated with the index i that gives the smallest value of $b_i(n)$ as the current model parameters $a(n)$ and $b(n)$.

18. The apparatus of claim 17, comprising means for calculating said input power estimate in accordance with the equation:

$$R_x(n) = \sum_{k=0}^{N-1} x^2(n-k)$$

where $x(n)$ is said input signal; and means for calculating said echo power estimate in accordance with the equation:

$$R_y(n) = \sum_{k=0}^{N-1} y^2(n-k)$$

where $y(n)$ is said echo signal.

19. The apparatus of claim 15, comprising means for estimating an echo delay $\Delta$ as the delay of the selected current model parameter $b(n)$.

20. The apparatus of claim 15, comprising means for estimating an echo return loss ERL in accordance with the equation:

$$ERL(n) = \frac{a(n) - b(n)}{\gamma}$$

where $\gamma$ is log (10)/10.

21. An echo suppressor in a telephony system, comprising:

means for forming an echo power estimate $R_y(n)$ of an echo signal, said echo power estimate depending on an input power estimate $R_x(n)$ of an input signal in accordance with the apparatus:

$$log(R_y(n)) = a(n) + C \cdot max(0, log(R_x(n)) - b(n))$$

where n represents discrete time, $a(n)$ and $b(n)$ are dynamically updated model parameters, and C is a predetermined constant;

means for estimating an echo delay $\Delta$ by the model parameter $b(n)$;

means for estimating an echo return loss ERL in accordance with the equation:

$$ERL(n) = \frac{a(n) - b(n)}{\gamma}$$

where $\gamma$ is log (10)/10;

means for estimating a dynamic clip level in accordance with the equation:

$$clip\ level(n) = \kappa \frac{R_x(n-\Delta)}{10^{\frac{ERL}{10}}}$$

where $\kappa$ is a predetermined constant, and;

a non-linear processor for suppressing said echo signal whenever its power falls below said clip level.

22. The echo suppressor of claim 21, comprising means for recursively determining said model parameters $a(n)$ and $b(n)$.

23. The echo suppressor of claim 22, comprising means for recursively determining said model parameters $a(n)$ and $b(n)$ in accordance with the equations:

$$\left. \begin{array}{l} e_i(n) = \log(R_y(n)) - a_i(n) - C \cdot \max[0, \log(R_x(n-i \cdot N) - b_i(n)] \\ a_i(n+1) = a_i(n) + \mu_a \cdot e_i(n) \\ b_i(n+1) = \begin{cases} b_i(n) - \mu_b \cdot C \cdot e_i(n) & \log(R_x(n-i \cdot N)) > b_i(n) \\ b_i(n) & \text{otherwise.} \end{cases} \end{array} \right\}$$

$$i = 0 \cdots i_{max}$$

where

N is a predetermined integer, i is an index representing a delay by i·N steps of discrete time, $i_{max}$ is an integer representing the maximum delay by $i_{max}$·N steps of discrete time, $a_i(n)$ and $b_i(n)$ denote model parameter estimates corresponding to a delay of i samples, $e_i(n)$ denotes an estimation error associated with a delay of i samples, and $\mu_a$ and $\mu_b$ denote step length parameters of the algorithm; and means for selecting the model parameter estimates $a_i(n)$ and $b_i(n)$ that are associated with the index i that gives the smallest value of $b_i(n)$ as the current model parameters $a(n)$ and $b(n)$.

24. The echo suppressor of claim 23, comprising means for calculated estimate in accordance with the equation:

$$R_x(n) = \sum_{k=0}^{N-1} x^2(n-k)$$

where $x(n)$ is said input signal; and means for calculating said echo power estimate in accordance with the equation:

$$R_y(n) = \sum_{k=0}^{N-1} y^2(n-k)$$

where $y(n)$ is said echo signal.

* * * * *